(12) United States Patent
Carlson et al.

(10) Patent No.: US 9,935,485 B2
(45) Date of Patent: Apr. 3, 2018

(54) TRANSITIONABLE MAGNETIC BARRIER FOR WIRELESS CHARGING DEVICE

(71) Applicant: Lenovo (Singapore) Pte. Ltd., New Tech Park (SG)

(72) Inventors: Jeremy Robert Carlson, Cary, NC (US); Philip John Jakes, Durham, NC (US); Larry Glenn Estes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 383 days.

(21) Appl. No.: 14/820,958

(22) Filed: Aug. 7, 2015

(65) Prior Publication Data

US 2017/0040829 A1    Feb. 9, 2017

(51) Int. Cl.
| | |
|---|---|
| *H02J 7/00* | (2006.01) |
| *H02J 7/02* | (2016.01) |
| *H02J 50/10* | (2016.01) |
| *H02J 50/70* | (2016.01) |

(52) U.S. Cl.
CPC .............. *H02J 7/025* (2013.01); *H02J 50/10* (2016.02); *H02J 50/70* (2016.02)

(58) Field of Classification Search
CPC ............. H02J 7/025; H02J 50/10; H02J 50/70
USPC ......................................... 320/107, 108, 114
See application file for complete search history.

(56) References Cited

U.S. PATENT DOCUMENTS

| | | | |
|---|---|---|---|
| 9,496,732 B2 | 11/2016 | Partovi | |
| 2013/0043734 A1 | 2/2013 | Stone et al. | |
| 2015/0123604 A1* | 5/2015 | Lee | H01F 38/14 320/108 |
| 2016/0072299 A1 | 3/2016 | Huang et al. | |
| 2016/0176299 A1* | 6/2016 | Kautz | B60L 11/182 307/9.1 |

OTHER PUBLICATIONS

Jeremy Robert Carlson, Philip John Jakes, Larry Glenn Estes, "Wireless Charging Device with Circuit Electrically Coupleable to First and Second Coils", related U.S. Appl. No. 14/820,850, Non-Final Office Action dated Nov. 14, 2017.
Jeremy Robert Carlson, Philp John Jakes, Larry Glenn Ests, "Wirelen Chargilnd Device with Circuit. Electrically Coupleable to First and Second Coils", file history of minted U.S. Appl. No. 14/820,850, filed Aug. 7, 2015.
Jeremy Robert Carlson, Philip John Jakes, Larry Glenn Estes, "Wireless Charging Device With Circuit Electrically Coupleable to First and Second Coils", related U.S. Appl. No. 14/820,850, Applicant's response to Non-Final Office Action filed Jan. 2, 2018.

* cited by examiner

*Primary Examiner* — Edward Tso
*Assistant Examiner* — Aaron Piggush
(74) *Attorney, Agent, or Firm* — John L. Rogitz; John M. Rogitz (57) ABSTRACT

In one aspect, a first device includes at least one wireless charge receiver that comprises a coil and a circuit electrically coupled to the coil. The first device also includes at least one barrier respectively positioned in the first device to transitionably shield, from a magnetic field of a wireless charge transmitter, at least one component of a second device in which the first device is disposable.

20 Claims, 6 Drawing Sheets

← Bottom element moves left

TRANSITIONABLE MAGNETIC BARRIER FOR WIRELESS CHARGING DEVICE

FIELD

The present application relates generally to transitionable magnetic barriers for wireless charging devices.

BACKGROUND

Wireless charging devices are increasing in prevalence. However, as recognized herein, wireless charge receivers are typically arranged on information handling systems to receive a wireless charge from a wireless charge transmitter while the information handling system is in but one physical orientation relative to the wireless charge transmitter. As also recognized herein, this can be problematic to a user when such an information handling system is a so-called "convertible" device and the user wishes to charge in more than one configuration of this device and hence more than one physical orientation.

SUMMARY

Accordingly, in one aspect a device includes a first panel at least bearing a keyboard, a second panel at least bearing a display and coupled to the first panel at least at a junction, a battery that powers the device and that is coupled to at least one of the first and second panels, and at least one wireless charge receiver on the first panel. The at least one wireless charge receiver comprises a coil and a circuit electrically coupled to the coil, where the circuit is electrically coupled to the battery. The device also includes at least two shields respectively positioned on the first panel to transitionably shield, from a magnetic field of a wireless charge transmitter, at least one component of the device. Thus, the device also includes a mechanism that transitions at least a portion of at least one of the at least two shields to a configuration, that at least partially shields at least one component from a magnetic field of a wireless charge transmitter.

In another aspect, a method includes providing a mechanism that transitions at least a portion of at least a first, magnetic field barrier associated with a wireless charge receiver disposed on a device to a first configuration that permits a magnetic field from a wireless charge transmitter to affect the wireless charge receiver, and that transitions at least the portion of at least the first magnetic field barrier to a second configuration different from the first configuration that limits the magnetic field from the wireless charge transmitter from affecting the wireless charge receiver relative to the effect of the magnetic field from the wireless charge transmitter while the first magnetic field harrier is in the first configuration.

In still another aspect, a first device includes at least one wireless charge receiver that comprises a coil and a circuit electrically coupled, to the coil, where the circuit electrically couples to a battery. The first device also includes at least one barrier respectively positioned in the first device to transitionably shield, from a magnetic field of a wireless charge transmitter, at least one component of a second device in which the first device is disposable.

The details of present principles, both as to their structure and operation, can best be understood in reference to the accompanying drawings, in which like reference numerals refer to like parts, and in which:

BRIEF DESCRIPTION OF THE DRAWINGS

FIGS. 3A-4B are side elevational views of devices in accordance with present principles;

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together In a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment cast be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
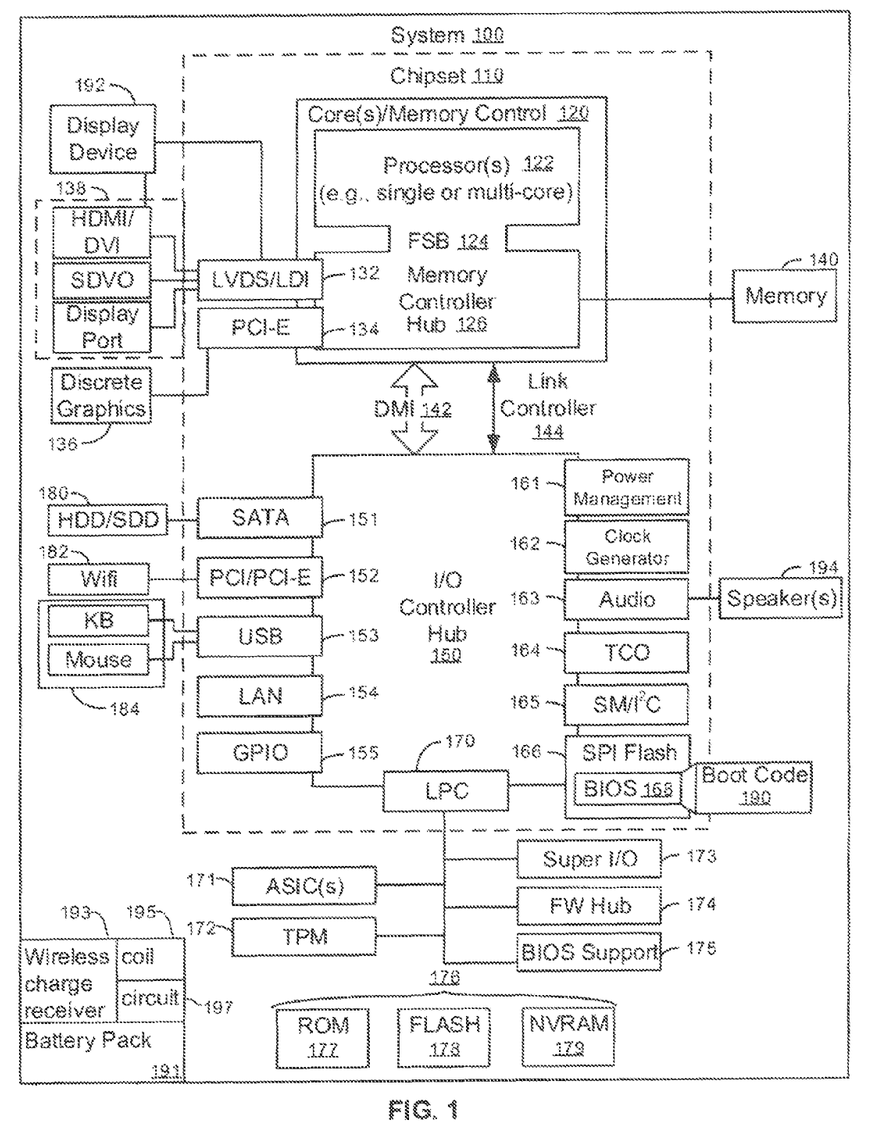
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the Yoga™ series of convertible computers or a ThinkStation®, which are sold by Lenovo (US) Inc. of Morrisville, N.C.; however, as apparent from the description herein, a client device, a server or other machine in accordance with, present principles may include other features or only some of the features of the system 100. Also, the system 100 may be, e.g., a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller huh 126 may provide support for DDR SDRAM memory (e.g., DDR, DDR2, DDR3, etc.). In general, the memory 140 is a type of random-access memory (RAM). It Is often referred to as "system memory."

The memory controller hub 126 further includes a low-voltage differential signaling interface (LVDS) 132. The LVDS 132 may fee a so-called LVDS Display Interface (LDI) for support of a display device 192 (e.g., a CRT, a flat panel, a projector, a touch-enabled display, etc.) . A block 138 includes some examples of technologies that may be supported via the LVDS interlace 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

The I/O hub controller 150 includes a variety of interfaces. The example of FIG. 3 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc, under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management, bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller ISO may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140), An operating system may be stored in any of a variety of locations and accessed, for example, according to instructions of the BIOS 168.

Furthermore, the system 100 may also include at least one battery pack 191 comprising at least one battery. The battery pack 191 is electrically coupled to and powers the system 100, and is also electrically coupled to at least one wireless charge receiver 193 that is configured for receiving a wireless charge via a magnetic field from a wireless charge transmitter (not shown) using, e.g., inductive wireless charging principles and/or resonant inductive coupling principles. Thus, the receiver 193 may comprise at least one coil 195, as may the wireless charge transmitter. The coil 195 may comprise at least one wire disposed around a magnet, and may be configured for receiving power from the wireless charge transmitter via the magnetic/electromagnetic field created by the transmitter when activated. The receiver 193 also includes at least one circuit 197 configured for receiving current from the coil 195 and doing at least one of: providing current to the system 100 to power it and providing current to the battery pack 191 to charge at least one battery in the pack 191. The circuit 197 may be comprised of one or more of a converter(s), a regulator(s), and/or a communicator(s).

Additionally, though now shown for clarity, in some -embodiments the system 100 may include a gyroscope for sensing and/or measuring the orientation of the system 100 and providing input related thereto to the processor 122, an accelerometer for sensing acceleration and/or movement of the system 100 and providing input related thereto to the processor 122, an audio receiver/microphone providing input to the processor 122 based on, e.g., a user providing audible input to the microphone, and a camera for gathering one or more images and providing input related thereto to the processor 122. The camera may be a thermal imaging camera, a digital camera such as a webcam., a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

Figure 2:
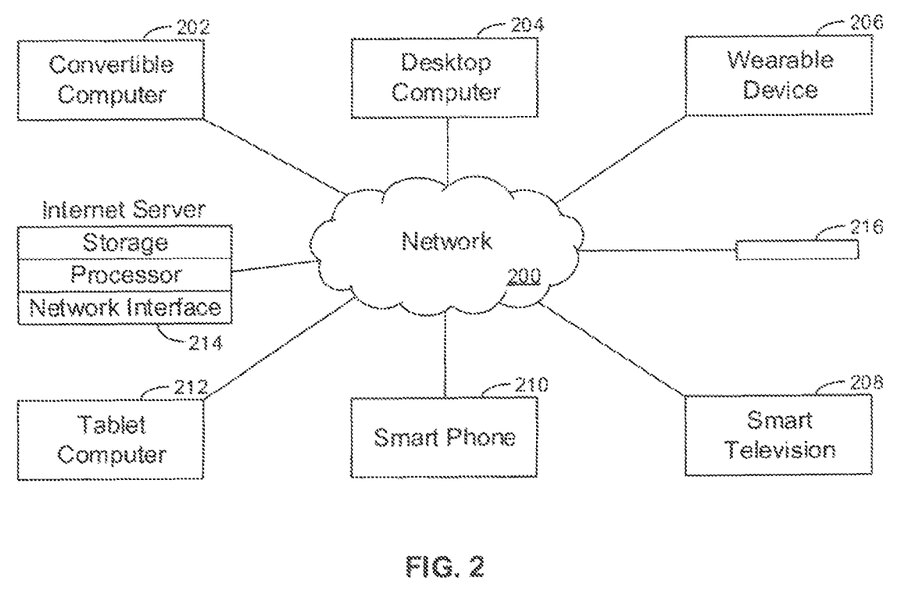
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake-present principles.

Turning now to FIG. 2, it shows example devices communicating over a network 200 such as the Internet in accordance with present principles. It is to be understood, that each of the devices described in reference to FIG. 2 may include at least some of the features, components, and/or elements of the system 100 described above. In any case, FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212.

Also shown in FIG. 2 is a wireless charge transmitter 216 configured for providing, to a wireless charge receiver, a wireless charge via a magnetic field using, e.g., inductive wireless charging principles and/or resonant inductive coupling principles. Thus, the wireless charge transmitter 216 may comprise at least one coil for undertaking present principles, and may be engaged (e.g., conductively coupled) to a wall outlet or other power source. It is to be understood that the devices 202-216 are configured to communicate with each other over the network 200.

Figure 3A:
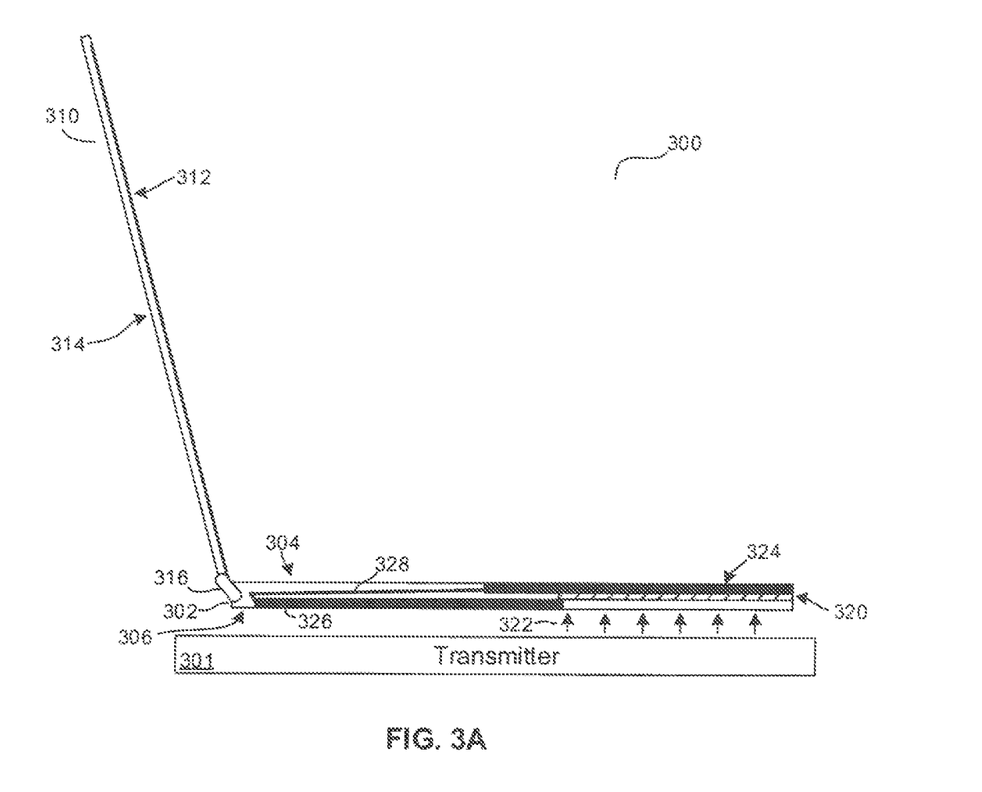
Figure 3B:
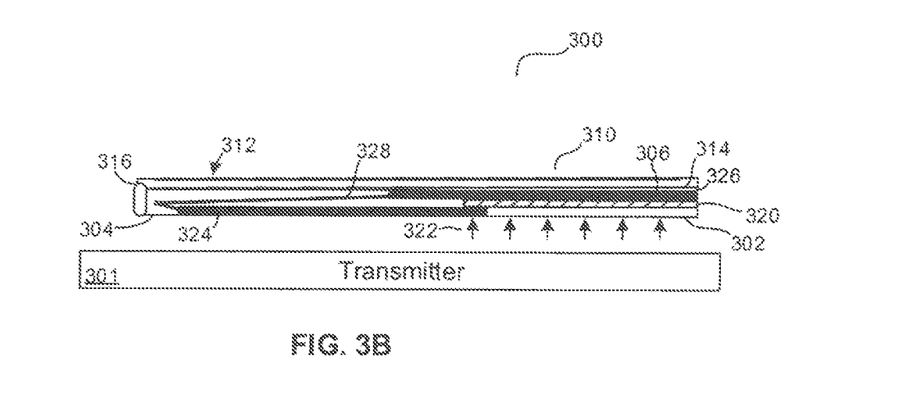

Continuing the detailed description in cross-reference to FIGS. 3A and 3B, they show side elevational views of a convertible computing device 300 and a wireless charge transmitter 301. In some example embodiments, the device 300 may be a Lenovo Yoga series convertible computer. In any case, the device 300 has a first panel 302 housing one or more system components such as those described above in reference to the system 100. The first panel 302 also has a first face 304 that bears a keyboard and is analogous to one established by an upper face of a bottom panel of a laptop computer that typically bears a keyboard. The first panel 302 also includes a second face 306 opposite the first face 304.

The device 300 also has a second panel 310 housing one or more system components, such as a display on a first face 312 that is analogous to one established by a front face of a top panel of a laptop computer that typically hears a display. The second panel 310 also has a second face 314 opposite the first face 312. As may be appreciated from both FIG. 3A and FIG. 3B, the first panel 302 is coupled to the second panel 310 at a junction 316, which in the present example may be a hinge, for rotating the first panel 302 relative to the second panel 310, or vice versa, around an axis established by a lengthwise dimension of the junction 316 going from one side of each respective panel 302, 310 to the other respective side of each panel 302, 310 (such as the sides tor the respective panels shown in the side elevational views of FIGS. 3A and 3B).

It is to fee understood that either or both of the panels 302 and 310 may be detachable from the junction 316 and hence detachable from each other to convert between, e.g., a laptop configuration for the device 300 as shown in FIG. 3A and a tablet-only configuration (not shown) in which the panel 310 may stand alone and function as a touch-enabled tablet computer without the panel 302. Furthermore, the junction 316 may be configured for facilitating rotation of the first panel 302 relative to the second panel 310 (when joined at the junction 316) around the axis established by the length of the junction 316 such that the device 300 may be transitioned from the laptop configuration as shown in FIG. 3A to a tablet configuration as shown in FIG. 3B in which the panels 302, 310 are still coupled to each other (via the junction 316) and in which the face 312 bearing the display feces a direction opposite the direction of the transmitter 301 relative to the device 300 so that a user may view content on the display from above the device 300 while a coil 320 is effected by a magnetic field 322 created by the wireless charge transmitter 301 to wirelessly charge a battery disposed in the device 300 in accordance with present principles (e.g., using inductive charging).

Still in reference to FIGS. 3A and 3B, note that the panel 302 includes plural shields and/or barriers 324, 326 (which may be sheets of ferrite) for at least partially shielding components of the device 300 (e.g., metal-based electronics) from the magnetic field 322 when in particular configurations to be described shortly (and/or otherwise directing magnetic flux away from these components), and for directing and/or concentrating magnetic flux toward the coil 320 for wireless charging. However, first note that the barriers 324, 326 are mechanically coupled to the junction 316, and/or to the first and/or second panels 302, 310, via at least one arm, lever, and/or other mechanism 328 (referred to below merely as an "arm" for simplicity) to move the barriers 324, 326 based on and/or responsive to movement of the panels 302, 310 relative to each other about the longitudinal axis of the junction 316 described above.

Also note that although the barriers may be mechanically coupled to the junction 316, and/or to the first and/or second panels 302, 310, via the arm 328 to mechanically move the barriers 324, 326 based on and/or responsive to movement of the panels 302, 310 relative to each other, they may also be moved electrically using the arm/mechanism 328 such as by actuating a motor forming part of the arm/mechanism 328 under control of a processor in the device 300 responsive to a determination that, one or both of the panels 302, 310 have been moved relative to each other. For instance, responsive to receipt of one or more signals from one or more sensors (e.g., motion sensors, position sensors, cameras, inertial sensors and/or accelerometers, etc.), it may be determined that one of the panels 302, 310 has been, transitioned relative to the other panel 302, 310 and hence the processor may provide a signal to the arm/mechanism 328 to move the barriers 324, 326 as set forth herein.

In any case, the barriers 324, 326 may (e.g., simultaneously) slide within the panel 302 (e.g., in at least one dimension, and optionally up to three such as side to side, front to back, up and down within the panel 302) under control of the arm 328 and based on movement of the panels 302, 310 relative to each other so that when the device 300 is in the laptop configuration as shown in FIG. 3A, the barrier 326 is at least partially removed from being between the coil 320 and space beneath the panel 302 and hence the transmitter 301 when disposed on it and/or above as shown so that the magnetic field 322 created by the transmitter 301 may affect the coil 320 to provide a wireless charge to the device 300. Furthermore, note that owing to the configuration of the panels 302, 310 relative to each other as shown in FIG. 3A, the arm 328 has slid and/or transitioned the barrier 324 to be disposed, e.g., adjacent to and/or at an opposite side of the coil 320 than the side facing the transmitter 301 to thus shield other system components within the panel 302 from the field 322 and hence prevent possible malfunctions of those other components that can be caused by the field 322. Notwithstanding, note that in some embodiments the barrier 324 may additionally or instead be disposed around other areas within the panel 302 that are exterior to and/or adjacent to the coil 320 to shield one or more system components from the field 322 while the coil 320 is effected by the field 322 to charge a battery of the device 300.

As may be appreciated from FIG. 3B, owing to the device being transitioned to the tablet configuration shown therein based on movement of the panels 302, 310 relative to each other, the panel 302 is now upside down relative to its orientation as shown in FIG. 3A and the arm 328 has slid and/or transitioned the barrier 324 at least partially away from the coil 320 so that it is at least partially removed from being between the coil 320 and space beneath the panel 302 and hence the transmitter 301 when the device 300 is disposed on it and/or above it in the configuration shown so that the magnetic field 322 created by the transmitter 301 may affect the coil 320 to provide a wireless charge to the device 300, Additionally, note that owing to the configuration of the panels 302, 310 relative to each other as shown in FIG. 3B, the arm 328 has slid and/or transitioned the barrier 326 so that it is disposed, e.g., adjacent to and/or at an opposite side of the coil 320 than the side facing the transmitter 301 to thus shield other system components within the panel 302 from the field 322 and hence prevent possible malfunctions of those other components that can be caused by influence of the field 322. Notwithstanding, note that in some embodiments the barrier 326 may additionally or instead be disposed around other areas within the panel 302 that are exterior to and/or adjacent to the coil 320 to shield one or more system components from the field 322 while the coil 320 is effected by the field 322 to charge a battery of the device 300.

It may now be appreciated that when the device 300 is in the laptop configuration shown in FIG. 3A, the barrier 326 has been moved out of the way to allow the coil 320 to receive power via the field 322 while the barrier 324 has been positioned adjacent to the coil 320 (but not between the coil 320 and the portion of the panel 302 through which a wireless charge may be received) to at least substantially shield and/or protect one or more other system components from the field 322 (e.g., to substantially shield so as to not affect the life arm function of the other component(s) being protected even if the field 322 has some negligible effect on the other component(s)). Furthermore, when the device 300 is in the tablet configuration shown in FIG. 3B, the barrier 324 has been moved out of the way to allow the coil 320 to receive power via the field 322 while the barrier 326 has been positioned adjacent to the coil 320 (but not between the coil 320 and the portion of the panel 302 through which a wireless charge may he received) to at least substantially shield and/or protect one or more other system components from the field 322 (e.g., to substantially shield so as to not affect the life and function of the other component(s) being protected even if the field 322 has some negligible effect on the other component(s)).

Figure 4A:
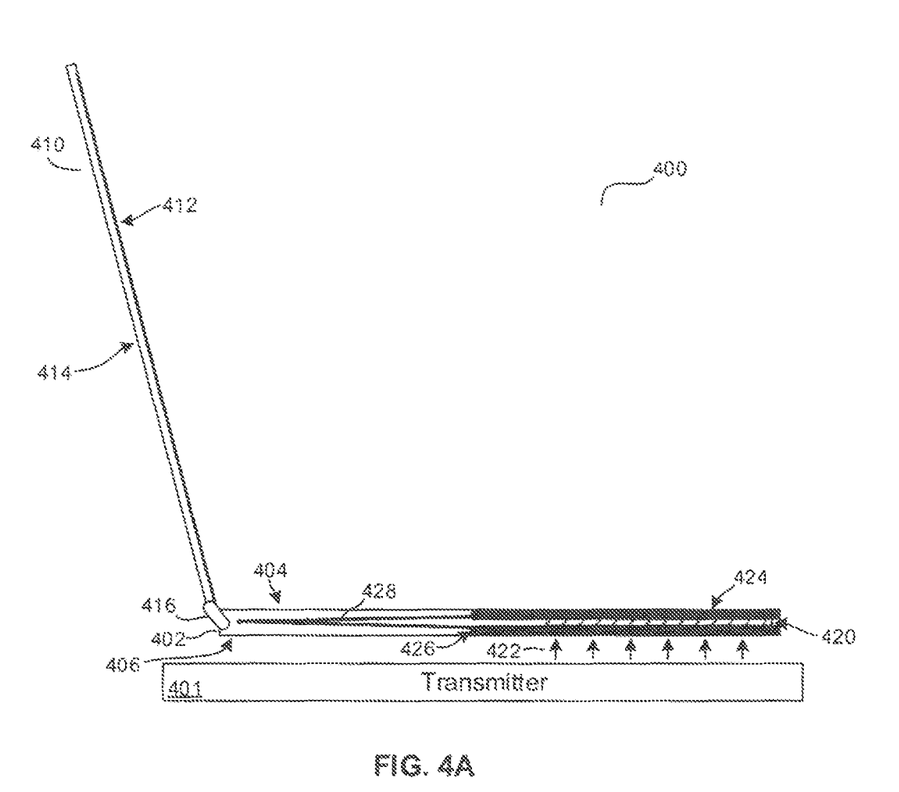
Figure 4B:
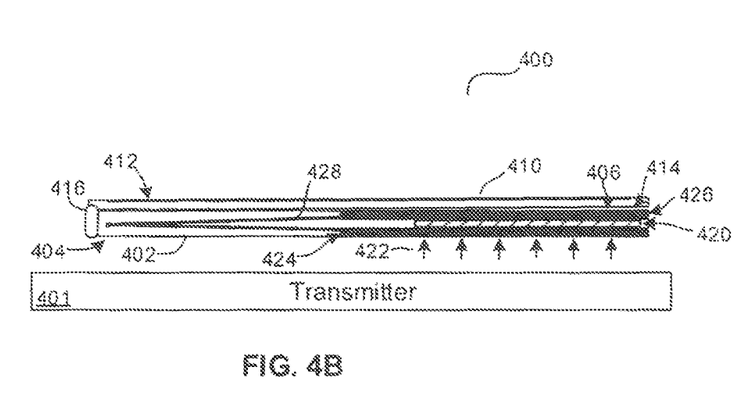

Before moving on to the description of FIGS. 4A and 4B, it is to be understood that the barriers 324, 326 may be composed at least partially of a ceramic, and more specifically, in example embodiments may be composed at least partially of ferrite. The magnetic field shields and/or magnetic field barriers to be described below in reference to FIGS. 4A-6B may be similar to the barriers 324, 326 described above and thus may similarly be composed at least partially of ceramic, and specifically ferrite in example embodiments.

Now in cross-reference to FIGS. 4A--4B, they show side elevational views of a convertible computing device 400 and a wireless charge transmitter 401. In some example embodiments, the device 300 may be a Lenovo Yoga series convertible computer, in any case, the device 400 has a first panel 402 housing one or more system components such as those described above in reference to the system 100. The first panel 402 also has a first face 404 that bears a keyboard and is analogous to one established by an upper face of a bottom panel of a laptop computer that typically bears a keyboard. The first panel 402 also includes a second face 406 opposite the first lace 404.

The device 400 also has a second panel 410 housing one or more system components, such as a display on a first face 412 that is analogous to one established by a front face of a top panel of a laptop computer that typically bears a display. The second panel 410 also has a second face 414 opposite the first face 412. As may be appreciated from both FIG. 4A and FIG. 4B, the first panel 402 is coupled to the second panel 410 at a junction 416, which in the present example may be a hinge, for rotating the first panel 402 relative to the second panel 410, or vice versa, around an axis established by a lengthwise dimension of the junction 416 going from one side of each respective panel 402, 410 to the other respective side of each panel 402, 410 (such as the sides for the respective panels shown in the side elevational views of FIGS. 4A and 4B).

Thus, as may be appreciated based on the foregoing, the panels 402 and 410, and junction 416, may be substantially similar in function and configuration, respectively, to the panels 302 and 310, and junction 316, save for what follows in the two paragraphs below. But first, it is to be understood that the device 400 may be transitioned from the laptop configuration as shown in FIG. 4A to a tablet configuration as shown in FIG. 4B in which the panels 402, 410 are coupled to each other (via the junction 416) and in which the face 412 bearing the display feces a direction opposite the direction of the transmitter 401 relative to the device 400 so that a user may view content on the display from above the device 400 while a coil 420 is effected by a magnetic field 422 created by the wireless charge transmitter 401 to wirelessly charge a battery disposed in the device 400 in accordance with present principles.

Still in reference to FIGS. 4A and 4B, note that the panel 402 includes plural shields and/or barriers 424, 426 for at least partially shielding components of the device 400 from the magnetic field 422 when in particular configurations to be described shortly. The barriers 424, 426 are mechanically coupled to the junction 416, and/or the first and second panels 402, 410, via at least one arm, lever, and/or other mechanism 428 (referred to below merely as an "arm" for simplicity) to transition the barriers 424, 426 between open and closed configurations based on and/or responsive to movement of the panels 402, 410 relative to each other about the longitudinal axis of the junction 416 described above. It is to be understood that based on the configuration of the arm 428, it is actuated to transition (based on movement of the panels 402, 410 relative to each other) one of the barriers 424, 426 to an open configuration to permit the field 422 to affect the coil (e.g., while that barrier is still at least in part disposed between the coil 420 and transmitter 401 and/or field 422) while transitioning another of the barriers 424, 426 to a closed configuration to shield one or more components of the device 400 from negative effects of the field 422. The barriers 424, 426 themselves may each include one or more louvers (such as the one described below in reference to FIG. 5) and/or one or more grates (such as the ones described below in reference to FIG. 6) for transitioning between open configurations (e.g., such that a barrier between the coil 420 and transmitter 401 is at least substantially open so that the field 422 effects the coil 420 to charge the device 400) and (e.g., at least partially) closed configurations (e.g., such that a barrier between the coil 420 and transmitter 401 is at least substantially closed so that the field 422 does not affect the coil 420 through that barrier to charge the device 400).

Also note that although the barriers may be mechanically coupled to the junction 416, and/or to the first and/or second panels 402, 410, via the arm 428 to mechanically transition the barriers 424, 426 based on and/or responsive to movement of the panels 402, 410 relative to each other to and between open and closed configurations, they may also be transitioned electrically using the arm/mechanism 428 such as by actuating a motor forming part of the arm/mechanism 428 under control of a processor in the device 400 responsive to a determination that one or both of the panels 402, 410 have been moved relative to each other. For instance, responsive to receipt of one or more signals from one or more sensors (e.g., motion sensors, position sensors, cameras, inertial sensors and/or accelerometers, etc.), it may be determined that one of the panels 402, 410 has been transitioned relative to the other panel 402, 410 and hence the processor may provide a signal to the arm/mechanism 428 to transition the barriers 424, 426 to open and/or closed configurations as set forth herein.

In any case, it is to be understood that in the example embodiment shown in FIGS. 4A and 4B, the barriers 424, 426 are not as a whole slid back and forth toward and away from the coil 420 similar to the embodiment described above in reference to FIGS. 3A and 3B, but instead may transition between these open and closed configurations. When the device 400 is transitioned from the tablet configuration to the laptop configuration shown in FIG. 4A, the arm 428 transitions the harrier 426 to an open configuration so that the device 400 may receive a wireless charge while it transitions the barrier 424 to a closed configuration to at least substantially shield one or more system components from the field 422. When the device 400 is transitioned from the laptop configuration to the tablet configuration shown in FIG. 4B, the arm 428 transitions the barrier 424 to an open configuration so that the device 400 may receive a wireless charge while it transitions the barrier 426 to a closed configuration to at least substantially shield one or more system components from the field 422. Further, it is to he understood that the barriers 424, 426 (and/or additional similarly structured and/or configured barriers that may be used) may be disposed around other areas within the panel 402 than those shown but that are nonetheless exterior to and/or adjacent, to the coil 420 to help shield one or more system, components from influence of the field 422.

Figure 5A:
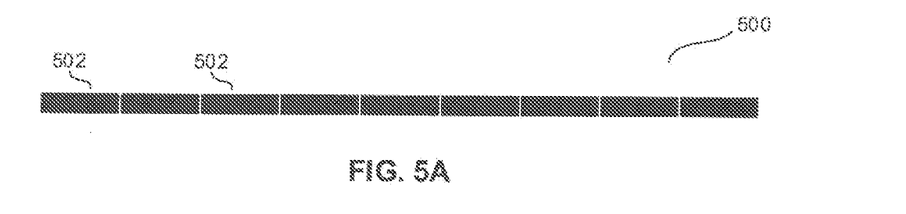
FIGS. 5A-5D show an example louver embodiment for a magnetic field barrier in accordance with present principles.
Figure 5B:
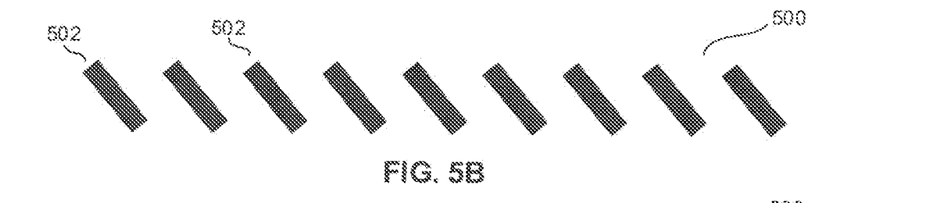
Figure 5C:
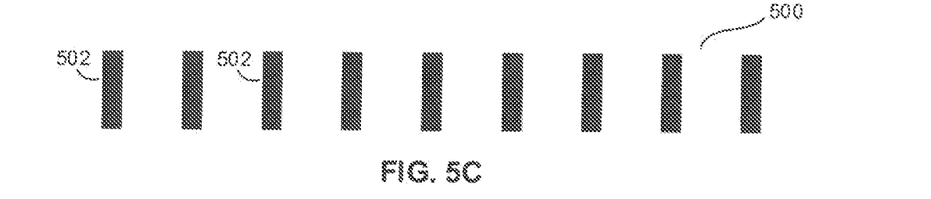
Figure 5D:
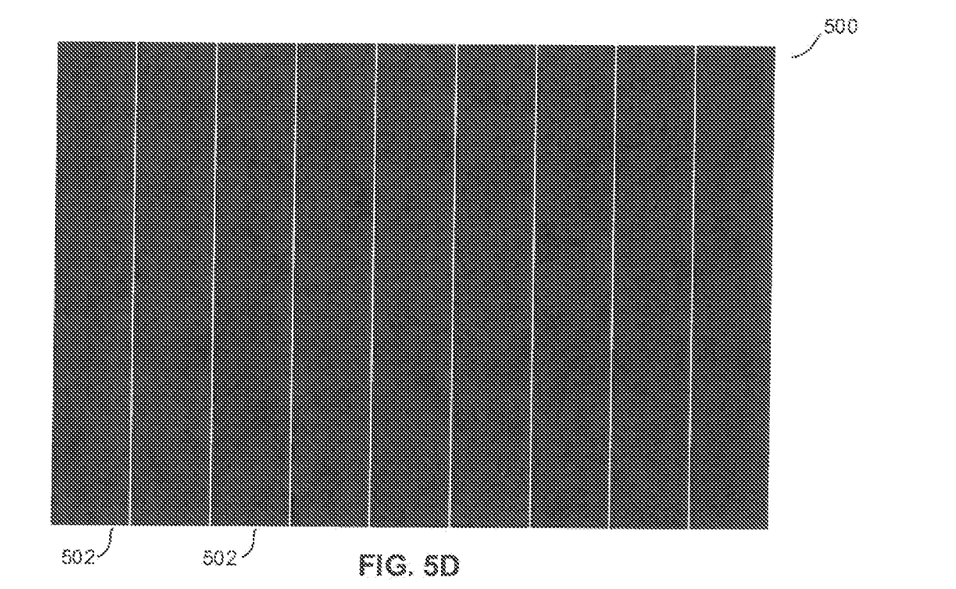

Moving on, reference is made to FIGS. 5A-5D, which show an example louver structure 500 (that may at least in pan be composed of a ferrite) at least partially establishing a barrier and/or shield, and/or that may be incorporated into a barrier and/or shield such as one of the barriers 424, 426 described above, in accordance with present principles. FIGS. 5A-5C respectively show side elevational views of the structure 500 relative to how it may he positioned in a device from the perspective shown in FIGS. 4A-4B, while FIG. 5D shows a top plan, view of the structure 500, However, the louver structure 500 may be configured and/or disposed in such a device in any suitable arrangement to undertake present principles. In any case, it is to be understood in reference to FIGS. 5A-5D that, for simplicity, only slats 502 of the louver structure 500 are shown to illustrate open and closed configurations but that other louver components may be incorporated into such a structure for undertaking present principles (e.g., a frame, as well as a lever(s), a pulley(s), and a chain(s) for transitioning the slats 502 between open and closed configurations, etc.). The slats 502 may at least in part be composed of a ferrite themselves.

Regardless, FIGS. 5A and 5D show a closed configuration, in which the slats 502 are transitioned (e.g., aligned)

such that little if any open space exists between respective elongated edges of the slats 502 to establish a barrier through which a magnetic field from one side may not reach a coil on an opposite side. In some example embodiments, at least some of the slats 502 may be configured to overlap at their elongated edges with other slats.

FIG. 5B shows positions of the respective slats 502 as the structure 500 is transitioned from the closed configuration of FIG. 5A to the open configuration shown in FIG. 5C (e.g., via a mechanism such as the arm(s) 428). Thus, FIG. 5B shows a configuration of the slats 502 as the device in which they are disposed is being transitioned between configurations (such as between the laptop and tablet configurations described above in reference to FIGS. 3A-4B) and in which at least some of a magnetic field may pass therethrough when a path is at least partially created during the transition. When the slats 502 are transitioned in the structure 500 to the configuration shown in FIG. 5C, a magnetic field may pass between the slats to each a coil and charge it wirelessly in accordance with present principles. In example embodiments, the slats when transitioned to the configuration shown in FIG. 5C may be parallel and/or establish parallel planes, in other example embodiments, the open, configuration may be established by a ratio of slat area to open area along a plane established by the height and width dimensions of the louver itself, such, as a four to one ratio.

Figure 6A:
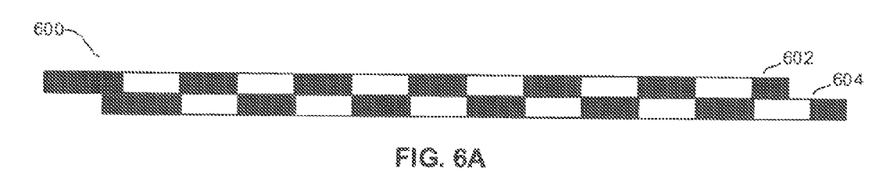
FIGS. 6A-6D show an example grate embodiment for a magnetic field barrier in accordance with present principles.
Figure 6B:
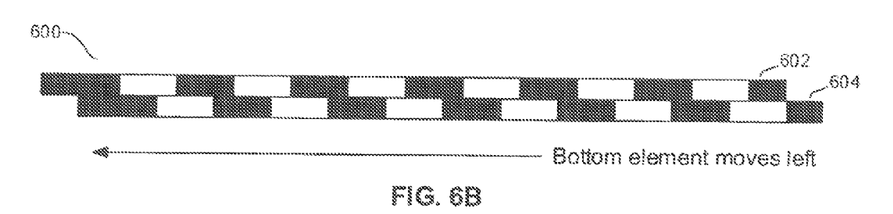
Figure 6C:
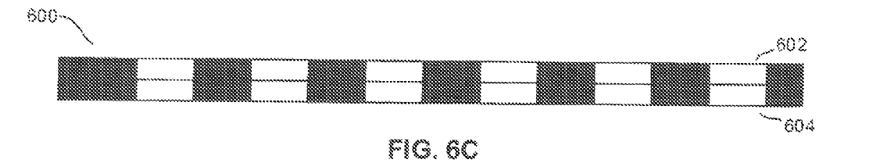
Figure 6D:
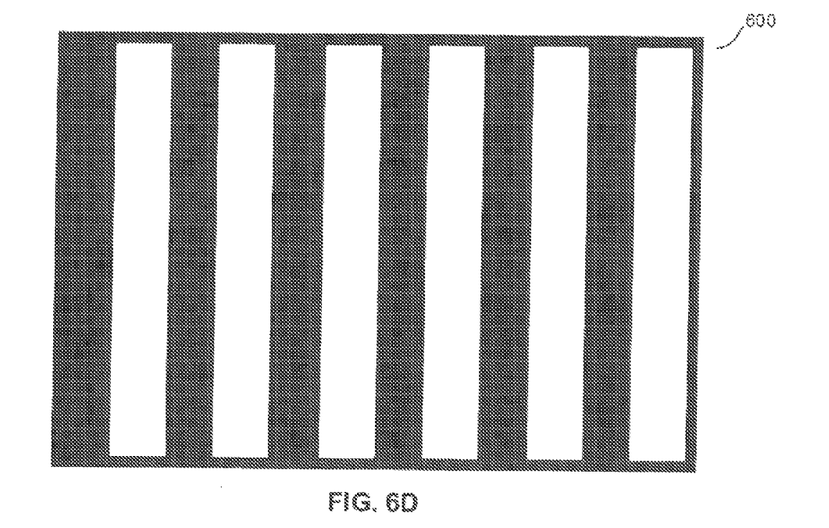

Continuing the detailed description in reference to FIGS. 6A-6D, they show an. example grate element 600 comprising, at least a first grate 602 and a second grate 604 and that may be at least partially composed of ferrite (e.g., the grates 602 and 604 may be made of and/or comprise ferrite). The grate element 600 is understood to at least partially establish a barrier and/or shield, and/or may be incorporated into a barrier and/or shield such as one of the barriers 424, 426 described above, its accordance with present principles. FIGS. 6A-6C respectively show side elevational views of the element 600 relative to how it may be positioned in a device from the perspective shown in FIGS. 4A-4B, while FIG. 6D shows a top plan, view of the element 600. However, the element 600 may be configured and/or disposed in such a device in any suitable arrangement to undertake present principles. In any case, it is to be understood in reference to FIGS. 6A-6D that, for simplicity, only the grates 602 and 604 of the element 600 are shown to illustrate open and closed configurations but that other grate element components may be incorporated into such a structure for undertaking present principles (e.g., respective tracks for sliding each of the grates 602, 604, as well as a lever(s), a pulley(s), and a chain(s) for sliding the grates 602, 604 between open and closed configurations, etc.).

FIG. 6A shows a closed configuration in which the grates 602, 604 are transitionable (e.g., slidable along respective tracks of the element 600) such that there is no path through the grates 602, 604, and/or in the grate element 600, through which a magnetic field from a wireless charge transmitter may travel to reach a coil on the other side of the element 600. Thus, it is to be understood that the darkened portions shown in FIGS. 6A-D are portions of the grates 602, 604 at least in part establishing such a barrier (e.g., and composed of ferrite), while the white portions shown are understood to comprise open space between bars of each grate 602, 604 to establish respective paths that when aligned with open space of the other of the grates 602, 604 as shown in FIGS. 6C and 6D to permit a magnetic field from a wireless charge transmitter to pass therethrough, to reach a coil and wirelessly charge a battery.

In contrast FIG. 6A illustrates that when the grates 602, 604 are not aligned with each other such that open spaces between bars of each are not aligned, they do not establish a path for the magnetic field to pass through but instead block it. FIG. 6B illustrates one example positioning of one of the grates 602, 604 relative to the positioning of the other of the grates 602, 604 while the grate element 600 is transitioned from the closed configuration of FIG. 6A to the open configuration shown in FIGS. 6C and 6D (e.g., via a mechanism such as the arm(s) 428) and in which at least some of a magnetic field may pass therethrough when a path is at least partially created during the transition. Thus, FIG. 6B is understood to show a configuration of the grates 602, 604 as the device in which they are disposed is being transitioned between configurations (such as between the laptop and tablet configurations described above in reference to FIGS. 3A-4B).

Furthermore, it is to fee understood that only one of the grates 602, 604 may be moveable within a device in which they are disposed tor alignment with the other of the grates 602, 604 via a mechanism such as the arm(s) 428 in some embodiments, while in other embodiments both of the grates 602, 604 may be movable within a device in which they are disposed (e.g., slidable along respective tracks) via such a mechanism. Also, it is to be understood that while either or both of the bars of the grates 602, 604 and the open spaces therebetween may be generally rectangular in shape in X and Y dimensions as shown in FIG. 6D, the bars and/or open spaces may vary in size and/or be other shapes.

Generally but still in accordance with present principles, it is to be further understood that in some example embodiments one or more shields and/or barrier(s) may circumscribe and/or completely surround (e.g., on all sides and/or surfaces) a wireless charging coil (e.g., and/or the wireless charge receiver itself) and that only one or more shields and/or barriers (and/or portions thereof) between the coil and a location of the device through which a wireless charge is to be received may be moved out of the way and/or transitioned to an at least partially open configuration to permit wireless charging, while other shields and/or barriers (and/or portions thereof) shield other metal-based electronics proximate to the coil (and/or wireless charge receiver itself) from the magnetic field/flux from the wireless charge transmitter to increase their life and/or prevent malfunction while also directing magnetic field/flux to the coil. Notwithstanding, in other embodiments such shields and/or barriers may be disposed merely adjacent to and/or against same portions of the coil but not others while still shielding such electronics and directing flux to the coil.

Furthermore, it is to be understood that present principles may be applied outside the context of the convertible computers described herein and may be used in still other kinds of convertible computers and other types of devices generally (e.g., e-books, tablet computing devices, wireless telephones, home appliances, etc.) for wirelessly charging batteries in those devices. For example, present principles may be applied in a laptop computer embodiment, where a wireless charge receiver when the laptop is closed cannot receive a wireless charge but can receive one when the laptop is at least partially open.

It may now be appreciated that present, principles provide for using merely a single coil and circuit for wireless charging (though more than one of each may be used in some embodiments) in various configurations/modes for a device while still shielding various other components from the magnetic field of a wireless charge transmitter. This may be done without electrically decoupling the wireless charge receiver from being able to charge a battery on the device and/or without undue restriction on which device configurations/modes may or may not be used during a charge.

While the particular TRANSITIONALBLE MAGNETIC BARRIER FOR WIRELESS CHARGING DEVICE is herein shown and described in detail, it is to be understood that the subject matter which is encompassed by the present application is limited only by the claims.

What is claimed is:

1. A device, comprising;
   a first panel at least bearing a keyboard;
   a second panel, at least bearing a display and coupled to the first panel at least at a junction;
   a battery that powers the device and that is coupled to at least one of the first and second panels; and
   at least one wireless charge receiver on the first panel, the at least one wireless charge receiver comprising a coil and a circuit electrically coupled to the coil, the circuit electrically coupled to the battery;
   at least two shields respectively positioned on the first panel to transitionably shield, from a magnetic field of a wireless charge transmitter, at least one component of the device; and
   a mechanism that transitions at least a portion of at least one of the at least two shields to a configuration that at least partially shields at least one component from a magnetic field of a wireless charge transmitter.

2. The device of claim 1, wherein the at least portion of at least one of the at least two shields transitionably at least substantially shields at least one component from a magnetic field of a wireless charge transmitter.

3. The device of claim 1, wherein at least respective portions of the at least two shields are positioned on the first panel to transitionably at least substantially shield at least one component from a magnetic field of a wireless charge transmitter.

4. The device of claim 1, wherein the mechanism transitions at least a portion of at least one of the at least two shields to an open configuration to permit a magnetic field of a wireless charge transmitter to affect the coil.

5. The device of claim 1, wherein the at least two shields respectively transitionably shield at least opposing sides of the coil from effect of a magnetic field of a wireless charge transmitter.

6. The device of claim 1, wherein the shields respectively comprise a ceramic.

7. The device of claim 1, wherein the shields respectively comprise ferrite.

8. The device of claim 1, wherein the coil comprises wire disposed around a magnet.

9. The device of claim 1, wherein the mechanism comprises at least one arm actuatable based on movement of the first panel relative to the second panel to at least in part:
   transition at least a portion of at least one of the at least two shields from an open configuration to a closed configuration to at least partially shield at least one component of the device from a magnetic field of a wireless charge transmitter; and
   transition at least the portion of at least one of the at least two shields from the closed configuration to the open configuration to at least partially permit a magnetic field of a wireless charge transmitter to affect the coil.

10. The device of claim 1, wherein at least one of the at least two shields comprises at least one louver, and wherein the mechanism comprises a member actuatable based on movement of the first panel relative to the second panel to at least in part:
    transition the at least one louver from an open configuration to a closed configuration; and
    transition the at least one louver from the closed configuration to the open configuration.

11. The device of claim 1, wherein at least a first shield of the at least two shields comprises at least a first louver, wherein at least a second shield of the at least two shields comprises at least a second louver, and wherein the mechanism comprises a member actuatable based on movement of the first panel relative to the second panel to at least in part:
    transition the at least first louver from an open configuration, to a closed configuration while transitioning the at least second louver from a closed configuration to an open configuration.

12. The device of claim 1, wherein at least one of the at least two shields comprises at least one grate element, and wherein the mechanism comprises a member actuatable based on movement of the first panel relative to the second panel to at least in part:
    transition the at least one grate element from an open configuration to a closed configuration; and
    transition the at least one grate element from the closed configuration to the open configuration.

13. The device of claim 1, wherein at least a first shield of the at least two shields comprises at least a first grate element, wherein at least a second shield of the at least two shields comprises at least a second grate element, and wherein the mechanism comprises a member actuatable based on movement of the first panel relative to the second panel to at least in part:
    transition the at least first grate element from an open configuration to a closed configuration while transitioning the at least second grate element from a closed configuration to an open configuration.

14. The device of claim 1, wherein the mechanism comprises at least one arm actuatable based on movement of the first panel relative to the second panel to:
    transition at least a portion of at least one of the at least two shields to a first configuration that at least partially shields at least one component of the device from a magnetic field of a wireless charge transmitter; and
    transition the at least portion of at least one of the at least two shields to a second configuration different from the first configuration that at least partially permits a magnetic field of a wireless charge transmitter to affect the coil.

15. The device of claim 14, wherein the at least one arm is actuatable based on movement of the first panel relative to the second panel to transition at least a first shield of the at least two shields to the first configuration while transitioning at least a second shield to a third configuration that at least partially permits a magnetic field of a wireless charge transmitter to affect the coil, and wherein the at least one arm is actuatable based on movement of the first panel relative to the second panel to transition at least the second shield to a fourth configuration that at least partially shields at least one component of the device from a magnetic field of a wireless charge transmitter while transitioning at least the first shield to the second configuration.

16. A method, comprising:
    providing a first panel of a device that at least bears a keyboard;
    providing a second panel of the device that at least bears a display and that is coupled to the first panel at least at a junction;

providing a battery that powers the device and that is coupled to at least one of the first and second panels; and providing at least one wireless charge receiver on the first panel, the at least one wireless charge receiver comprising a coil and a circuit electrically coupled to the coil, the circuit electrically coupled to the battery;

providing at least two shields respectively positioned on the first panel to transitionably shield, from a magnetic field of a wireless charge transmitter, at least one component of the device; and providing a mechanism that transitions at least a portion of at least one of the at least two shields to a configuration that at least partially shields at least one component from a magnetic field of a wireless charge transmitter.

17. The method of claim 16, wherein the at least portion of at least one of the at least two shields transitionably shields at least one component from a magnetic field of a wireless charge transmitter.

18. The method of claim 16, wherein the mechanism transitions at least a portion of at least one of the at least two shields to an open configuration to permit a magnetic field of a wireless charge transmitter to affect the coil.

19. The method of claim 16, wherein the shields respectively comprise at least one of: a ceramic, ferrite.

20. The method of claim 16, wherein the mechanism comprises at least one arm actuatable based on movement of the first panel relative to the second panel to:

transition at least a portion of at least one of the at least two shields to a first configuration that at least partially shields at least one component of the device from a magnetic field of a wireless charge transmitter; and transition the at least portion of at least one of the at least two shields to a second configuration different from the first configuration that at least partially permits a magnetic field of a wireless charge transmitter to affect the coil.

* * * * *